United States Patent [19]

Kato et al.

[11] Patent Number: 4,844,953

[45] Date of Patent: Jul. 4, 1989

[54] ELASTIC ROLLER FOR FIXING AND METHOD OF PRODUCING THE SAME

[75] Inventors: Chiaki Kato; Toshiyuki Hatta; Akihiko Isomura; Shinichi Toyooka; Masaya Nishi, all of Osaka, Japan

[73] Assignee: Sumitomo Electric Industries, Ltd., Osaka, Japan

[21] Appl. No.: 194,624

[22] Filed: May 16, 1988

[30] Foreign Application Priority Data

May 15, 1987 [JP] Japan ................................ 62-119739

[51] Int. Cl.4 ........................ B05D 3/02; B21B 31/08; B60B 5/00; B60B 21/00

[52] U.S. Cl. ...................................... 427/387; 29/132; 427/409; 428/36.8; 430/99

[58] Field of Search ............... 29/132; 427/387, 407.1, 427/409, 411.1; 428/36; 430/99

[56] References Cited

U.S. PATENT DOCUMENTS

| | | | |
|---|---|---|---|
| 3,937,919 | 2/1926 | Clerx et al. | 432/60 X |
| 4,372,246 | 2/1983 | Azar et al. | 29/132 X |
| 4,375,505 | 3/1983 | Newkirk | 430/99 |
| 4,439,462 | 3/1984 | Tarumi et al. | 118/101 X |
| 4,568,275 | 6/1986 | Sakurai | 432/60 |

FOREIGN PATENT DOCUMENTS

| | | |
|---|---|---|
| 0156046 | 10/1985 | European Pat. Off. . |
| 2515143 | 11/1975 | Fed. Rep. of Germany . |

OTHER PUBLICATIONS

Japanese Patent Abstract 58-27175—7/17/83 vol. 7, No. 105 (P195) (1250).
Japanese Pat. Abstract 60-205560—3/14/86 vol. 10, No. 64 (P-436) (2121).
Japanese Pat. Abstract 59-52269—7/17/84 vol. 8, No. 153 (P-287) (1590).
Japanese Pat. Abstract 60-179770—2/5/86 vol. 10, No. 30 (P-426) (2087).
European Search Report—7/21/88.

*Primary Examiner*—Michael Lusignan
*Attorney, Agent, or Firm*—Cushman, Darby & Cushman

[57] ABSTRACT

The invention provides an elastic roller for use in an apparatus for fixing a toner image, electrostatically formed on copy paper by passing the toner image between two rollers, comprising a roller core, a fusible fluororesin layer coated on the outside of the roller core, a porous fluororesin having porous portions affixed to the roller core through the fusible fluororesin layer, and a rubber impregnated into the porous portions of the porous fluororesin. It also provides a method for making an elastic roller including the steps of fusing a fusible fluororesin layer on the outside of a roller core or base; affixing a porous fluororesin having porous portions to the roller core through the fused fluororesin layer; filling the porous portions of the porous fluororesin with a rubber after fusing the porous fluororesin to the roller core; and hardening the rubber.

15 Claims, 1 Drawing Sheet

ELASTIC ROLLER FOR FIXING AND METHOD OF PRODUCING THE SAME

BACKGROUND OF THE INVENTION

The present invention relates generally to a roller for use in a fixing section or the like of a copying machine, a line printer, facsimile equipment. More specifically, the invention relates to an elastic roller for use in a fixing operation.

Generally, a fixing section of a copying machine or the like is arranged as shown in FIG. 3. Copy paper 13 having toner 12 transferred thereon is passed between a heat-fixing roller 10 and a pressure-fixing roller 11 to fix an image on the copy paper by the double action of heat and pressure.

Heat fixing roller 10 is formed by applying a fluororesin coating 15 of the order of tens of microns to the surface of a roller core 14, made of metal, such as aluminum or the like, ceramics or heat-resisting plastics, or a roller formed by applying a silicone rubber or fluororubber coating having the thickness of 1 mm or less to the surface of the roller core 14.

Pressure fixing roller 11 is formed by applying a heat-resisting rubber coating 17, having a thickness of the order of millimeters and hardness of the order of tens of degrees, to a roller core 16 made of aluminum or the like.

Separating pawls 18, each having a width of the order of millimeters, are attached at four or five places to prevent the copy paper from coiling, usually on the heat-fixing roller side. In high-speed copying machines and double-side copying machines, separating pawls 19 are also provided on the pressure-fixing roller side as shown in FIG. 3. Reference numeral 20 designates a heater.

However, the fixing rollers 11 and 15 are sometimes damaged by being scraped by the separating pawls when the copy paper is coiled on the rubber roller, so that the rubber roller cannot be used any more. In order to overcome this problem, there was developed a roller as disclosed in Japanese Patent Unexamined Publication No. 60-179770.

The roller disclosed in Unexamined Publication 60-179770 is formed by covering a roller core with a porous (poly-)tetrafluoroethylene resin (P.T.F.E.), impregnating the porous portions of the porous P.T.F.E. with heat-resistant liquid silicone rubber, and hardening the liquid silicone rubber. The rubber is hardly damaged by the separating pawls and that the lifetime thereof is prolonged several times.

However, the roller disclosed in Unexamined Publication No. 60-179770 has deficiencies in that, even if the silicon rubber bonds to the roller core due to a high self-adhesive property, sufficiently large bonding strength is not attained because of occurrence of separation of the porous (poly-)tetrafluoroethylene resin from the rubber at the interference therebetween. This is one of factors which contributes to poor durability of the roller. The disclosed roller also has the disadvantage in that the bonding strength is weakened in long-term use.

Further disadvantages of such a fluororesine coating roller include poor quality of the copied image, difficulty in fixing, and tendency to wrinkle the paper etc., because the roller has no elasticity.

Thus, an object of the present invention is to solve the aforementioned problems.

SUMMARY OF THE INVENTION

The present invention provides an elastic roller for use in an apparatus for fixing a toner image, electrostatically formed on copy paper by passing the toner image between two rollers. The roller according to the invention comprises: a roller core, a fusible fluororesin layer coated on the outside of the roller core, a porous fluororesin having porous portions affixed to the roller core through the fusible fluororesin layer, and a rubber impregnated into the porous portions of the porous fluororesin.

The invention also provides a method for producing an elastic roller including the steps of: fusing a fusible fluororesin layer on the outside of a roller core or base; affixing a porous fluororesin having porous portions to the roller core through the fused fluororesin layer; filling the porous portions of the porous fluororesin with a rubber after fusing the porous fluororesin to the roller core; and hardening the rubber.

DETAILED DESCRIPTION OF THE PREFERRED EMBODIMENT

Figure 1:
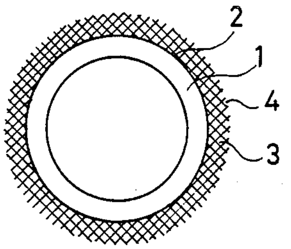
FIG. 1 is a sectional view showing the structure of an elastic roller according to the present invention.
Figure 3:
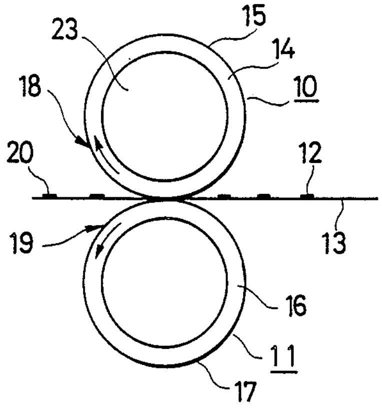
FIG. 3 is a side view of a generally-used fixing device.
Figure 2:
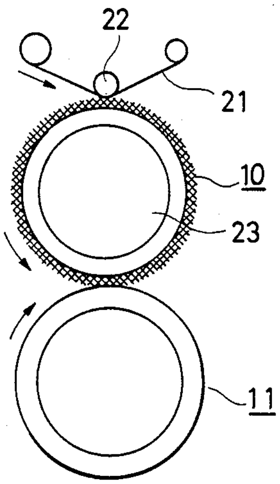
FIG. 2 is side view showing the construction of a fixing device using the elastic roller according to the present invention.

The present invention will be described in detail with reference to the illustrative drawings. FIGS. 1 and 2 are according to the invention; FIG. 3 shows a generally-used device.

The elastic roller for fixing according to the present invention, as shown in FIG. 1, comprises a roller base, that is, a roller core 1, a fusible fluororesin layer 2 provided on the roller core, a porous fluororesin having porous portions 3, and a hardened rubber 4. The porous fluororesin are affixed to the roller core through the fluororesin layer, and then the porous portions are filled with the rubber, which is thereafter hardened.

The roller core 1 may be formed of the same material as described above in the prior art. The fusible fluororesin layer 2 can be formed of perfluoroalkoxy (P.F.A.) resin or the like. The porous fluororesin 3 may be formed of (poly-) tetrafluoroethylene (P.T.F.E.) resin or the like. The rubber 4 may be formed of silicone rubber, fluororubber or the like.

The aforementioned construction improves the bonding strength of the porous fluororesin, such as tetrafluoroethylene resin and the like.

The roller is made by affixing a porous fluororesin 3 to a roller core 1 through a fusible fluororesin layer 2 by heating. Thereafter the porous portions of the porous fluororesin are impregnated with, for example, liquid silicone rubber 4, and the liquid silicone rubber 4 is then hardened. The surface may then be finished by grinding.

An unsintered drawn-tube of a porous (poly-) tetrafluoroethylene resin is advantageously used in the invention. In this case, the roller core which has been heated with the fusible fluororesin layer is covered with the porous drawn-tube, and then heated at a temperature not lower than the melting point of (poly-)tetrafluororethylene resin. The fusible fluororesin is simultaneously further affixed to the roller core.

The thus prepared elastic roller may be used not only as the heat-fixing roller 10, but also as the pressure-fixing roller 11. It can also be widely used as an elastic roller when heat-resisting and/or surface lubricating properties are desired.

In the elastic roller according to the present invention, the bonding strength between the roller core and the porous fluororesin, such as (poly-)tetrafluoroethylene resin or the like, can be improved by the fluororesin layer provided on the outside of the roller core.

In the method of producing the elastic roller according to the present invention, an excellent elastic roller as described above can be easily obtained because the porous portions of the porous fluororesin, for example, (poly-) tetrafluoroethylene resin or the like, are filled with the rubber after the porous fluororesin has been affixed to the roller core through the fusible fluororesin layer. Particularly, the use of an unsintered porous tube as described above has the following advantages compared with the use of a sintered porous tube.

1. The sintering process can be omitted.

2. The bonding strength between the tube and the roller core can be improved because the radially compressing force of the tube is increased by the use of the unsintered drawn-tube.

3. The bonding strength does not change in long-term use.

Examples

The following examples of the present invention will be described with reference to FIGS. 1 and 2.

The surface of each of 60 mm roller cores 1 made of aluminum was degreased, and then a dispersion of perfluoroalkoxy (P.F.A.) resin 2 (AD-1 produced by Daikin Kogyo Co., Ltd., fusing temperature of 300° to 305° C.) was applied to the surface of each roller core 1 to form a coating layer having a thickness of from 10 to 20 μm. The resulting roller cores were baked at 320° C. for ten minutes. After baking, each of the roller cores was covered with a (poly-)tetrafluoroethylene resin porous tube 3 having an internal diameter of 61 mm, a thickness of 0.7 mm and porosity of 85%, and then was subject to heat-affixing treatment at 350° C. for 30 minutes in the condition that the opposite ends of the tube was fixed to prevent the tube from compressing longitudinally. After the heat-affixing treatment, the porous portions of the tubes of the respective roller bases were impregnated with self-adhesive liquid silicone rubber 4 (CY52-005 produced by Toray Silicone Co., Ltd.) and hardened in the respective conditions at 150° C. for 30 minutes, and at 200° C. for 15 minutes. As the result, the hardness of rubber in the surface layer of the thus produced elastic toller was 55 degrees.

The strength of the elastic rollers in a separation test of 90 degrees was measured in the following three cases.

(I) The case where a sintered porous tube of (poly-) tetrafluoroethylene resin was used.

(II) The case where an unsintered porous drawn-tube of (poly-)tetrafluoroethylene resin was used.

(III) The case where the hardening and affixing treatment was carried out by the use of liquid silicone rubber having self-adhesive property without P.F.A. resin coating in the generally-used manner as a comparative example.

Figure 4:
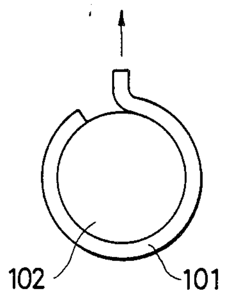
FIG. 4 shows the method for measuring the strength of the elastic rollers in a separation test of 90 degrees in the Examples.

In this measurement, the surfaces of the elastic rollers were cut into 10 mm width. As shown in FIG. 4, one portion of the rubber surface layer 101 of each of the elastic rollers was peeled off from the roller core 102 which was rotatably supported, and was stretched out in a direction perpendicular to the tangential direction of the roller with a tension tester, so that the separation strength of the elastic rollers were measured.

The results are shown in Table 1, in which the width of each sample was 10 mm.

TABLE 1

| | Longitudinally (Kg) | Radially (Kg) |
|---|---|---|
| (I) | 0.7 | 1.2 |
| (II) | 1.2 | 1.7 |
| (III) | 0.3 | 0.5 |

It is apparent from the Table 1 that the bonding strength between the porous fluororesin and the roller core is greatly improved and that the values of bonding strength in the cases (I) and (II) are twice or more and three times or more as much as that in the case (III) respectively.

The surface of the roller produced in the case (II) was further polished or ground by 0.2 mm. The resulting roller was used as a heat-fixing roller in a fixing device in a copying machine capable of duplicating 50 sheets of A4-size paper per minute, and, as shown in FIG. 2, a web 21 was used as a member for cleaning the surface of the heat-fixing roller 10. As the result of practical-use test, even hundred-million sheets of paper could be copied with the copy image of good quality without injury by the separating pawls, without separation of the porous tube of (poly-)tetrafluororethylene resin and without injury by the separating pawls, and without deterioration of the friction strength. In FIG. 2 the reference numeral 22 designates a compression roller, and the reference numeral 23 designates a heater.

As described above, in the elastic roller of the present invention, the porous fluororesin is stuck to the roller core to thereby improve the friction strength thereof to be for example 1.5 times or more compared with the prior art case where rubber is merely used for adhesion. Accordingly, the present invention can provide an elastic roller greatly improved in durability and reliability to be used for the purposes of fixing and the like.

Further, according to the elastic roller producing method of the present invention, an excellent elastic roller as described above can be easily produced.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. An elastic roller for use in an apparatus for fixing a electrostatically formed toner image comprising:

a roller core, a fusible fluororesin layer coated on the roller core, a porous fluororesin having porous portions affixed to the roller core through the fusible fluororesin layer, and a hardened rubber impregnated into the porous portions of the porous fluororesin.

2. The elastic roller according to claim 1, in which the fusible fluororesin layer comprises a perfluoroalkoxy (P.F.A.) resin.

3. The elastic roller according to claim 1, in which the porous fluororesin comprises a (poly-)tetrafluoroethylene (P.T.F.E.) resin.

4. The elastic roller according to claim 1, in which the rubber filling the porous portions of the porous fluororesin is a silicone rubber.

5. The elastic roller according to claim 1, in which the rubber filling the porous portions of the porous fluororesin is a fluororubber.

6. An elastic roller for use in an apparatus for fixing a electrostatically formed toner image comprising:

a roller core, a layer of perfluoroalkoxy resin fused to the roller core, a layer of porous (poly-)tetrafluoroethylene resin affixed to the roller core through the perfluoroalkoxy resin layer, and a hardened rubber impregnated into the porous portions of the porous (poly-)tetrafluoroethylene.

7. The elastic roller of claim 6 wherein the rubber is a silicone rubber.

8. The elastic roller of claim 6 wherein the rubber is a fluororubber.

9. A method of producing an elastic roller for use in a fixing apparatus for fixing a toner image electrostatically formed on copy paper by passing the tone image between two rollers comprising the steps of:

forming a fusible fluororesin layer on the outside of a roller core;

coating the fusible fluororesin layer with a porous fluororesin having porous portions;

affixing the porous fluororesin to the roller core through the fluororesin by heating;

impregnating the porous portions with a rubber after affixing the porous fluororesin; and hardening the rubber after filling the porous portions.

10. The method according to claim 9, wherein the coating step comprises coating the fusible fluororesin layer with a (poly-)tetrafluoroethylene resin and wherein the affixing step comprises the steps of:

covering the roller core fused with the fusible fluororesin layer with an unsintered drawn-tube of the porous fluororesin; and simultaneously heating the drawn-tube at a temperature not lower than the melting temperature of the (poly-)tetrafluoroethylene resin and affixing the drawn-tube onto the roller core.

11. The method according to claim 9, wherein the forming step comprises forming a fusible perfluoroalkoxy (P.F.A.) resin layer on the roller core.

12. The method according to claim 9, wherein the impregnating step comprises impregnating the porous portions of the porous fluororesin with a silicone rubber.

13. The method according to claim 9, wherein the impregnating step comprise impregnating the porous portions of the porous fluororesin with a fluororubber.

14. The method according to claim 11, wherein the impregnating step comprises impregnating the porous portions of the porous fluororesin with a silicone rubber.

15. The method according to claim 11, wherein the impregnating step comprise impregnating the porous portions of the porous fluororesin with a fluororubber.

* * * * *